Dec. 31, 1957   H. F. BEAUMONT   2,818,142
SHOCK ABSORBER RESERVOIR VALVES
Filed March 18, 1954
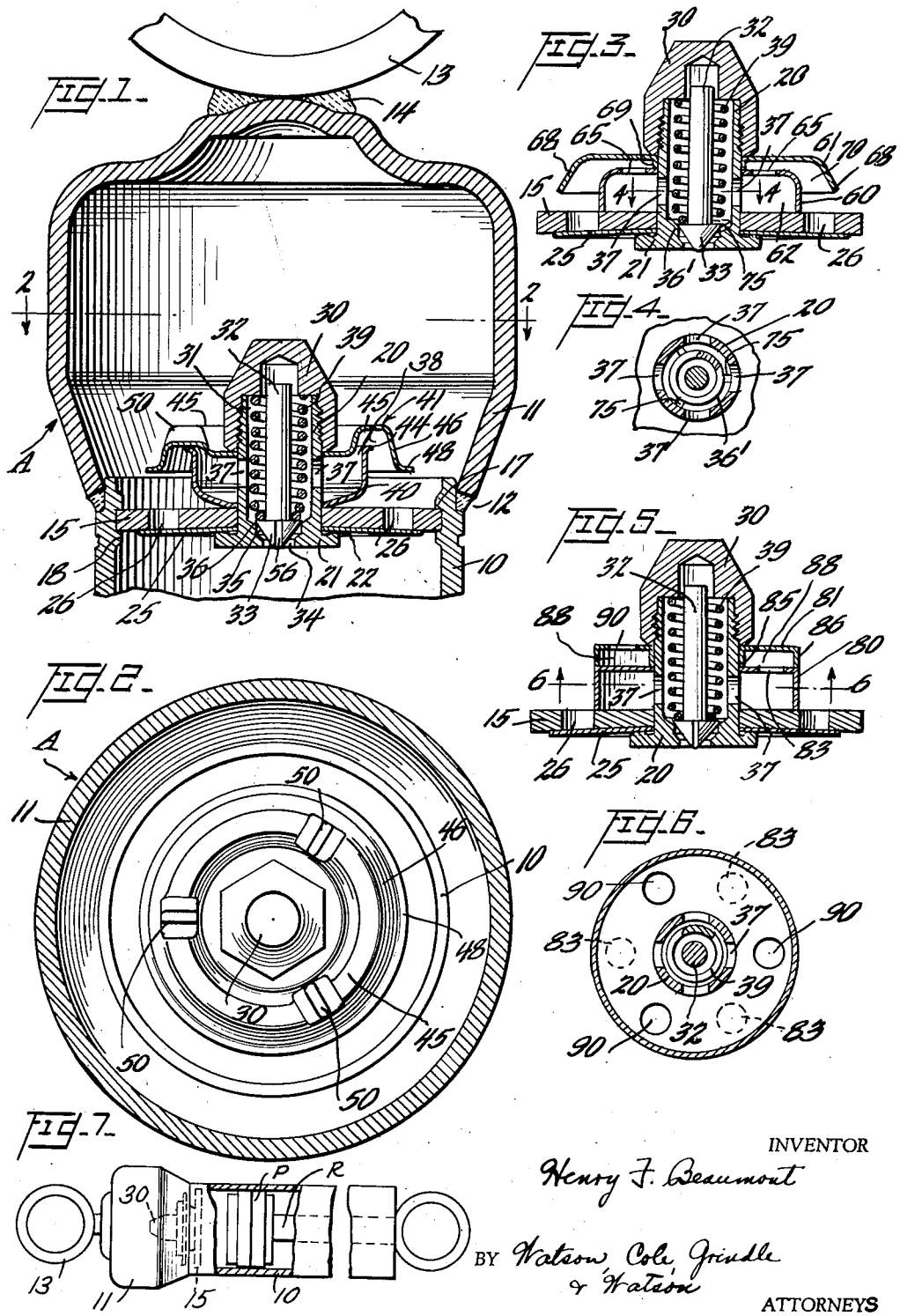
INVENTOR
Henry F. Beaumont
BY Watson, Cole, Grindle
& Watson
ATTORNEYS

United States Patent Office 2,818,142
Patented Dec. 31, 1957

2,818,142

SHOCK ABSORBER RESERVOIR VALVES

Henry F. Beaumont, Littleton, Colo., assignor, by mesne assignments, to Christian Marie Lucien Louis Bourcier de Carbon, Neuilly-sur-Seine, France Application March 18, 1954, Serial No. 417,136

6 Claims. (Cl. 188—100)

This invention relates to shock absorbers and more particularly to shock absorbers of the direct-acting fluid-displacement type adapted especially, though not exclusively, for use on automotive vehicles.

The general object of the invention is the provision of novel and improved fluid transferring devices disposed between the working chamber of a shock absorber of the class described and the reservoir or cavitation chamber thereof.

The principles of the invention are particularly applicable to shock absorbers of the type disclosed in the co-pending application of De Carbon Ser. No. 145,788, filed February 23, 1950, now United States Patent 2,719,612, granted October 4, 1955, and the parent applications of which that application is a continuation-in-part. Reference is also made to the co-pending applications of De Carbon Ser. No. 252,488, filed October 22, 1951, now United States Patent 2,757,762, granted August 7, 1956, and Tautz Ser. No. 413,852, filed March 3, 1954, for the disclosure of fluid valving and baffling means aimed at the solution of problems similar to those attacked by the present conception.

It will be understood from a perusal of the above mentioned applications that the general type of shock absorber to which this invention relates, involves the provision of a fluid chamber disposed in the casing at a position above the working chamber in which the piston reciprocates, this expansion of reserve chamber (commonly called a cavitation chamber) being adapted to contain a supply of working fluid held in ready availability for keeping the working chamber full of liquid at all times, thus preventing the formation of voids or air pockets, which would seriously interfere with the efficient operation of the shock absorber. Also, as is well known in the art, the piston rod as it enters the working chamber displaces liquid therefrom, and thus the expansion chamber serves to accommodate this displaced fluid, receiving it through certain spring-resisted valving means, and readily giving it up to the working chamber, upon retraction or withdrawal of the piston rod, through valving of very slight resistance. The valving for both directions of flow is appropriately selected or adjusted with relation to the rate of displacement of liquid past the piston so as to prevent cavitation at any expected piston velocity.

Obviously, the reservoir chamber also takes care of any thermal expansion of the body of working fluid.

One distinctive feature of the shock absorbers disclosed in the prior applications to which reference has been made, is the attachment of the cylinder or working chamber of the shock absorber to the body or chassis of the vehicle and the piston rod to the wheel mounting. This arrangement ensures that the body of liquid carried in the cylinder is supported by the sprung weight and is therefore not subjected to the continual and sometimes violent vibrations of the unsprung wheel and axle assemblies. This provision curbs excessive emulsification and foaming of the working liquid to a large extent, and it is another object of the present invention to provide certain baffle and diverter features which will further aid in maintaining the body of liquid, especially within the reservoir at the top of the working cylinder and adjacent the surface of the liquid, in a relatively quiescent state and free from excess turbulence or splashing.

The liquid level is maintained at the highest practical point within the reservoir leaving a small volume of air at the very top of the chamber, which volume of air naturally varies during operation.

Aside from the violent agitation of the entire fluid containing casing in the conventional shock absorber installation, foaming is generally caused by any sharp jetting of working fluid into the cavitation chamber or reservoir, and especially when such jets pass through the liquid contained therein and burst through the upper surface into the air pocket at the top of the reservoir.

Thus it has been found that foaming can be reduced by directing the jetting of the fluid from the working chamber radially outwardly within the cavitation chamber, as explained in the De Carbon applications referred to, and also in accordance with the present invention by providing an outlet for the discharge of this fluid of a substantially continuous annular or circular extent, thus reducing the velocity of the emitted liquid as compared with the velocity of the same liquid through the initial valve passageways of the partition assembly which separates the two chambers.

In its preferred embodiment the invention contemplates the provision of a pair of dished or cup-like inter-related sheet metal members having their open portions facing each other and providing a permanently open fluid sub-chamber immediately beyond the valving means through which the working fluid is ejected from the working chamber into the cavitation chamber. The rims or margins of these interengaging cup members are so arranged as to provide a tortuous annular passageway which extends completely around the central valving installation and provides a maze-like ejection means which is of constantly increasing cross-section in the passage of the fluid outwardly from the central valving device. The tortuous nature of the passageway and the continual increase in cross-section of the passageway ensures that the stream of fluid as it finally enters the cavitation chamber proper does so at a greatly diminished velocity as compared with the jetting of the fluid through the initial valving. The arrangement also permits the accumulation and amalgamation of any fine bubbles, resulting from incipient foaming below the baffle device, to form larger bubbles within the tortuous passageway which are periodically released and rise harmlessly to the surface of the liquid in the cavitation chamber.

Certain modifications of the compression-stroke valving provided by this invention besides aiding in the elimination of air bubbles, also afford very soft boulevard riding qualities in the vehicle.

Other objects and features of novelty will be apparent from the following specification, when read in connection with the accompanying drawings in which certain embodiments of the invention are illustrated by way of example.

In the drawings:

Figure 1 is a fragmentary view in vertical section of the upper portion of the shock absorber which embodies the principles of the invention;

Figure 2 is a horizontal sectional view taken on line 2—2 of Figure 1;

Figure 3 is a detail view in vertical section of a modified form of cavitation chamber valving and baffling means;

Figure 4 is a fragmentary sectional view taken on line 4—4 of Figure 3;

Figure 5 is a view similar to Figure 3 but showing a still further modification of the invention;

Figure 6 is a view in cross-section taken on line 6—6 of Figure 5; and

Figure 7 is a somewhat diagrammatic view on a greatly reduced scale and partially in section showing the arrangement of the piston and piston rod with respect to the casing of the shock absorber.

Referring more particularly to Figures 1 and 2 of the drawings, the shock absorber proper is indicated generally by the reference character A and comprises a casing or housing which includes essentially the generally cylindrical portion 10 to which is secured a cap or dome-like end structure 11, as by means of the welding 12. An eye 13 is shown fragmentarily in Figure 1, being welded to the top of the dome 11 as at 14 and adapted to contain an elastic grommet by which the upper end of the shock absorber is secured to one of the members, the motion of which is to be damped. A piston P reciprocates in the working chamber of the shock absorber and is rigidly fixed upon the upper end of the piston rod R, which passes through an opening in the lower end of the casing, as shown in the diagrammatic view of Figure 7. In the case where this type of shock absorber is employed in an automotive vehicle, it is preferred that the upper end be secured to the chassis of the vehicle rather than to the wheel mounting, the lower end of the piston rod of the shock absorber being secured to the latter member through suitable means not shown.

In the preferred embodiment of the invention which is shown in Figures 1 and 2, there is secured within the upper end of the cylindrical portion 10 of the casing the margins of the partition disc or plate 15, the upper surface of this disc abutting the shoulder 17 and the lower portion of the disc and coming in contact with the protuberances 18 formed by a staking process after the plate 15 is inserted. This procedure ensures that the partition and its attached valving arrangements may be rigidly secured in place within the casing after the casing is assembled and the interior has been thoroughly washed out to eliminate any foreign matter such as the oxides which might be produced by the welding operation at 12.

An opening is formed in the partition plate 15 axially thereof and into this opening is forced a hollow stem member 20 having a lower head 21 which is provided with a marginal annular boss 22 which bears against the central portion of the spring valve disc 25 which serves to control the passage of fluid through the series of openings 26 formed in the plate. It will be noted that the undersurface of the partition plate 15 is of a slightly concave configuration and this ensures that the originally flat spring disc 25 is placed under a slight initial tension. However, the valving of the return flow of fluid through the openings 26 is such as to permit the ready return of fluid from the cavitation chamber upon recession of the piston rod through the lower end of the cylinder of the shock absorber.

The hollow stem 20 is provided with screw threads at its upper end and a threaded cap member 30 is secured onto the stem which effectively closes its upper end and completes a valve chamber 31 in which is contained the valve member 32 which is rivet shaped and has a conical head 33. The inlet passageway whereby fluid enters the valve chamber 31 from the working chamber of the shock absorber is initially rather narrow as shown at 34. The passage is stepped to give it a slightly larger diameter as at 35 and it is stepped again to provide a valve seat at 36 against which the surface of the head 33 of the valve normally rests. At least two diametrically opposed openings 37 are provided in the wall of the hollow stem 20 and preferably the sum of the cross-sectional areas of these openings is still greater than the maximum opening afforded between the valve head 33 and the seat 36. A coil spring 39 urges the valve 32 toward its seat.

The continually expanding cross-section principle applied to the passageway through the valving and baffling device from the working chamber to the cavitation chamber is further supplemented by the baffle installation which comprises the interengaging cup elements 40 and 41. These elements may be stamped from sheet metal of suitable gauge and preferably, though not necessarily, stiff enough to resist distortion under pressure of the ejected fluid. The lower cup-like member 40 has a central opening which surrounds the hollow stem 20 and rests upon the top of the partition plate 15 at its central portion. The member 40 preferably has an out-turned marginal lip 44 at its upper outer margin. The upper member 41 is of an inverted dished configuration and has a central opening which is fitted about the hollow stem 20 immediately beneath the cap 30 and abutting the lower margins of said cap. The inverted cup member 41 has an interrupted annular trough-like portion 45 which surrounds and receives the marginal lip 44 of the lower member 40 and the outer portion of the upper member 41 extends downwardly and outwardly as at 46 and terminates in the flared lip 48.

Intermittently around the inverted trough 45 there are formed notched portions or indentations 50, and for proper balance and bracing of the structure it is suggested that a minimum of three of these notched portions be provided, and it is also suggested that the number of such notches be kept as low as possible so as not to interfere with the continual outward expansion of the tortuous fluid passageway.

It will be readily understood that even though the ejected fluid passes through the initial portion of the valving passageways at 34 with considerable velocity, the cross-section of such passageway is continually increasing, past the seat 36, through the interior of the stem 20, outwardly of the openings 37, through the central portion of the tortuous chamber 38 confined between the members 40 and 41, which chamber increases in cross-section as the fluid moves radially outwardly thereof and into the cavitation chamber proper. By the time the fluid passes outwardly beyond the downturned lip 48 of the upper member 41, the velocity has diminished sufficiently to prevent any deleterious foaming.

The interior of the hollow stem 20 beyond the seat of the valve 33, the openings 37, the chamber within the inverted cup 40, and the tortuous passageway 38 may all be considered to comprise a continually expanding system and may be designated as a sub-enclosure which is located centrally of the expansion chamber and provides a sort of ante-chamber for the introduction of fluid into said expansion chamber.

Another phenomenon to be noted in connection with the structure and functioning of this device is that there is a tendency for any air which might initially be entrained in the working fluid and which might pass up through the initial portions of the valved passageway in the form of a foam or emulsion, to have a tendency to accumulate within the inverted trough 45, and such slight foaming as may exist will combine or concentrate in the form of fairly large bubbles and these bubbles (until the foaming entirely disappears) may be seen issuing intermittently from under the lip 48 and rising harmlessly to the surface of the liquid in the expansion chamber.

For the further purpose of permitting any entrapped fluid to pass freely from the working chamber into the cavitation chamber, especially in the case of a newly installed shock absorber, the conical face of the valve head 33 is provided with one or more grooves 56 through which any initially entrained air bubbles may pass either of their own accord, or by a few reciprocations of the piston which may be accomplished manually before the shock absorber is installed.

In the embodiment illustrated in Figures 3 and 4 of the drawings the basic structure is the same, but the baffling arrangement comprises two inverted dish-like sheet metal members 60 and 61. The member 60 is roughly cylindrical and encloses an initial chamber 62 into which fluid emerges from the openings 37. The upper portion of the member 60 is provided with a series of annular openings 65, the total cross-section of which is greater than the total of the cross-section of the openings 37 in the stem 20.

The upper member 61 is provided with downwardly and outwardly flared marginal portions 68 and an inwardly disposed flange 69 which spaces it properly from the lower member 60 and its openings 65. The space 70 between the two members 60 and 61 is of course of continually increasing cross-section as the fluid moves radially outwardly and this increase is augmented by the flared nature of the flange 68 giving the outlet a trumpet-like aspect. Thus the arrangement in this embodiment also furthers the idea of a continually expanding enclosure by which the velocity of the fluid passing therethrough is gradually reduced and the jetting effect of the expulsion of the fluid from the working chamber diminished to prevent foaming.

In the embodiment shown in Figures 3 and 4 the valve head 33 may be grooved or notched as at 56 in Figure 1, but as an alternative the valve seat 36' may be provided with grooves or notches 75 as shown.

In the embodiment shown in Figures 5 and 6 of the drawings the baffling arrangement is again comprised of two inverted cup-like elements, the lower one of which is designated 80 and the upper one 81. The lower member 80 is provided in its top wall with an annular series of openings 83 of which there are three in the suggested embodiment illustrated, although a greater number could be provided. The upper member 81 has an inner downwardly turned annular flange 85 by which it is spaced from the member 80 and at its outer margin a similar downwardly turned flange 86 forms an enclosed annular chamber 88 into which the fluid passes from the openings 83. In the upper wall of the upper member 81 there is provided an annular series of openings 90 which are preferably out of register with the openings 83 so that the fluid must take a tortuous course in passing through the baffling arrangement into the cavitation chamber proper. The number and size of the openings 83 and 90 may be varied to regulate the continual increase of cross-section of the passageway for the fluid.

The provision of the minute slots or grooves in the compression-stroke valve or in its seat lends an important further advantage to the shock absorber in which it may be incorporated. Not only does it permit the purging of any air trapped in the working chamber or in suspension in the oil, after a few strokes of the piston, but at low piston velocity, this provision, in conjunction with the laminar piston clearance, gives a very soft "boulevard" ride. Further, by virtue of the entire arrangement there is no danger at any time of air bubbles escaping from the cupped baffle elements to be returned to the working chamber when the piston reverses its stroke upon rebound.

It will be understood that various changes and modifications may be made in the embodiments illustrated and described herein without departing from the scope of the invention as defined by the following claims.

Having thus described the invention, what is claimed as new and desired to be secured by Letters Patent is:

1. In a shock absorber of the class described, a casing enclosing in axial sequence a working chamber and an expansion chamber having a transverse partion wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; an opening in said partition through which fluid from the working chamber is forced upon inward movement of the piston rod, valving means controlling said opening to resiliently resist flow therethrough upon the compression stroke of the piston, and means affording reverse flow of fluid from said expansion chamber to said working chamber, upon recession of the piston rod; enclosing means defining a sub-enclosure within said expansion chamber surrounding said opening and into which fluid is preliminarily discharged from said opening, said opening being located centrally of said enclosure, said enclosure itself opening radially outwardly substantially throughout its outer periphery, the interior of said enclosure through which the displaced fluid flows being of substantially continuously increasing cross-section from the valved central opening in said partion to the peripheral discharge opening of the enclosure, whereby the velocity of the fluid is diminished from jet force at the central opening to gentle emission at the periphery into the expansion chamber proper, said enclosing means consisting of but two cupped plates of relatively stiff sheet material, said plates being fixed and immovable with relation to each other and interengaging to form a tortuous chamber of substantially continually increasing cross-sectional area, and said chamber being continually open even when no fluid is flowing through the discharge system.

2. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; an opening in said partition through which fluid from the working chamber is forced upon inward movement of the piston rod, valving means controlling said opening to resiliently resist flow therethrough upon the compression stroke of the piston, and means affording reverse flow of fluid from said expansion chamber to said working chamber, upon recession of the piston rod; enclosing means defining a sub-enclosure within said expansion chamber surrounding said opening and into which fluid is preliminarily discharged from said opening, said opening being located centrally of said enclosure, said enclosure itself opening radially outwardly substantially throughout its outer periphery, the interior of said enclosure through which the displaced fluid being of substantially continuously increasing cross-section from the valved central opening in said partition to the peripheral discharge opening of the enclosure, whereby the velocity of the fluid is diminished from jet force at the central opening to gentle emission at the periphery into the expansion chamber proper, said enclosing means comprising two cupped plates, one of the plates having an annular trough formed therein and opening toward the other plate, and the margin of the other plate terminating radially inwardly of the margin of the first named plate and entering said trough to form a tortuous chamber of substantially continually increasing cross-section in the direction of radially outward flow of fluid.

3. The arrangement set forth in claim 2 in which said trough is bulged inwardly or indented at least at one point around its periphery to form a rest for the peripheral edge of said other plate which enters the trough.

4. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding values of fluid are displaced into the expansion chamber, and said volumes of fluid are returned from the expansion chamber upon recession of the piston rod; a central opening in said partition, and means affording reverse flow of fluid from said expansion chamber to said working chamber, upon recession of the piston rod; a hollow post fixed in said opening and rising axially into said expansion chamber, the interior of said hollow post constituting a valve chamber closed at its upper end and having an opening in the lower end thereof through which fluid may flow from said working chamber upon entry of successive portions of the piston rod, a valve in said valve chamber adapted to seat on the margins of said opening, a spring in said hollow post urging said valve toward its seat with predetermined resilient pressure, laterally outwardly directed openings in the side walls of said hollow post of greater cross-sectional area than that of said valved inlet opening, a pair of annular discs having their central openings surrounding said post respectively above and below said laterally directed openings, one of said discs having an annular trough formed therein and opening toward the other disc, and the margin of the other disc terminating radially inwardly of the margin of the first named disc and entering said trough to form a tortuous chamber of substantially continuously increasing cross-section in the direction of radially outward flow of fluid.

5. The shock absorber as set forth in claim 4 in which said valve is provided with bleed grooves in its seating surface, through which any entrapped air may work its way upwardly into said sub-enclosure.

6. In a shock absorber of the class described, a casing enclosing in axial sequence a working chamber and an expansion chamber having a transverse partition wall between them; a piston reciprocable in said working chamber and having a rod which passes through the end of said casing opposite to the expansion chamber, whereby upon entry of successive portions of the piston rod into the working chamber corresponding volumes of fluid are displaced into the expansion chamber, and said volumes of fluid are returned from the expansion chamber upon recession of the piston rod; an opening in said partition through which fluid from the working chamber is forced upon inward movement of the piston rod, and means affording reverse flow of fluid from said expansion chamber to said working chamber, upon recession of the piston rod; a central valve chamber above said opening, a spring pressed valve in said chamber controlling flow through said opening, laterally outwardly directed openings in the walls of said central valve chamber, an annular enclosure surrounding said valve chamber adapted to receive displaced fluid from said laterally directed openings and discharge said fluid through substantially its entire periphery into said expansion chamber proper in increased volume but greatly diminished velocity, said annular enclosure comprising a pair of annular discs having central openings surrounding the valve chamber upon either side of said laterally outwardly directed openings in said valve chamber, the outer margins of the discs cooperating to provide a peripheral discharge orifice of greater cross-section than the orifices through which the fluid enters the enclosure, one of the plates having an annular trough formed therein and opening toward the other plate, and the margins of the other plate terminating radially inwardly of the margins of the first named plate and entering said trough to form a tortuous chamber of substantially continually increasing cross-section in the direction of radially outward flow of fluid.

References Cited in the file of this patent

UNITED STATES PATENTS

| 2,196,089 | Wallace | Apr. 2, 1940 |
| 2,471,294 | Watts | May 24, 1949 |
| 2,593,372 | Watts | Apr. 15, 1952 |

FOREIGN PATENTS

| 430,337 | Great Britain | June 13, 1935 |
| 671,712 | Great Britain | May 7, 1952 |
| 677,857 | Great Britain | Aug. 20, 1952 |